US009268487B2

United States Patent
Gibbons et al.

(10) Patent No.: US 9,268,487 B2
(45) Date of Patent: Feb. 23, 2016

(54) METHOD AND APPARATUS FOR RESTRICTING WRITES TO SOLID STATE MEMORY WHEN AN END-OF LIFE CONDITION IS REACHED

(71) Applicant: Western Digital Technologies, Inc., Irvine, CA (US)

(72) Inventors: Kent W. Gibbons, Yorba Linda, CA (US); Colin W. Morgan, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 93 days.

(21) Appl. No.: 14/275,032

(22) Filed: May 12, 2014

(65) Prior Publication Data

US 2015/0268873 A1    Sep. 24, 2015

Related U.S. Application Data

(60) Provisional application No. 61/969,635, filed on Mar. 24, 2014.

(51) Int. Cl.
*G06F 3/06* (2006.01)
*G06F 9/44* (2006.01)
*G06F 12/02* (2006.01)
*G06F 11/20* (2006.01)

(52) U.S. Cl.
CPC ............ *G06F 3/0616* (2013.01); *G06F 3/0632* (2013.01); *G06F 3/0679* (2013.01); *G06F 9/4401* (2013.01); *G06F 11/2094* (2013.01); *G06F 12/0246* (2013.01)

(58) Field of Classification Search
CPC ............ G06F 12/0246; G06F 11/2094; G06F 2212/7203; G06F 2212/1036
USPC .......................................................... 711/103
See application file for complete search history.

(56) References Cited

U.S. PATENT DOCUMENTS

| | | | |
|---|---|---|---|
| 6,856,556 B1 | 2/2005 | Hajeck |
| 7,126,857 B2 | 10/2006 | Hajeck |
| 7,356,442 B1 | 4/2008 | Astigarraga et al. |
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,590,666 B2 | 9/2009 | Korman et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |

(Continued)

OTHER PUBLICATIONS

International Search Report and Written Opinion dated May 26, 2015 from related PCT Serial No. PCT/US2015/021817, 16 pages.

*Primary Examiner* — Than Nguyen

(57) ABSTRACT

A data storage device including a solid state memory comprising logical block addresses ("LBAs") corresponding to boot data accessed by a host during a boot process, and a controller. The controller can be configured to determine the LBAs corresponding to the boot data, and determine whether the solid state memory has reached an end-of-life condition. Upon determining that solid state memory has reached an end-of-life condition, the controller can restrict the host to write to the LBAs corresponding to the boot data during a boot process, and set the solid state memory into a read only mode when the boot process is complete.

31 Claims, 6 Drawing Sheets

(56) References Cited

U.S. PATENT DOCUMENTS

| | | |
|---|---|---|
| 7,685,374 B2 | 3/2010 | Diggs et al. |
| 7,733,712 B1 | 6/2010 | Walston et al. |
| 7,765,373 B2 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,179 B2 | 1/2012 | Astigarraga et al. |
| 8,108,180 B2 | 1/2012 | Astigarraga et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,327,066 B2 * | 12/2012 | Heo et al. ........................ 711/103 |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,489,942 B1 * | 7/2013 | Wong et al. .................... 714/710 |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,863 B1 * | 1/2014 | Kanapathippillai et al. .... 710/62 |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2005/0044454 A1 | 2/2005 | Moshayedi |
| 2007/0204128 A1 | 8/2007 | Lee et al. |
| 2008/0130156 A1 | 6/2008 | Chu et al. |
| 2008/0177938 A1 | 7/2008 | Yu |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2012/0179865 A1 | 7/2012 | Kudo et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0040681 A1 * | 2/2014 | Wolfman et al. ............. 714/704 |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

* cited by examiner

METHOD AND APPARATUS FOR RESTRICTING WRITES TO SOLID STATE MEMORY WHEN AN END-OF LIFE CONDITION IS REACHED

CROSS-REFERENCE TO RELATED APPLICATIONS

This application claims the benefit of U.S. Provisional Application No. 61/969,635, filed on Mar. 24, 2014, entitled "RESTRICTING WRITES TO SOLID STATE DRIVES WHEN NEAR END OF LIFE CONDITION IS DETECTED," which is hereby incorporated by reference in its entirety.

BACKGROUND

A solid state memory in an electronic device may have a limited amount of write erase cycles available. Conventionally, when the solid state memory reached a certain number of write erase cycles, the solid state memory may be set to a read only mode. However, in the read only mode, the electronic device may not be able to boot up because it may need to write to the solid state memory.

If the electronic device cannot be booted up, it may be difficult to access the data in the solid state memory. This can not only necessitate the replacement of the solid state memory, but also a cumbersome process to retrieve the data stored in the solid state memory by utilizing a replacement memory. However, inability to utilize the replacement memory may result in data loss in the solid state memory.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
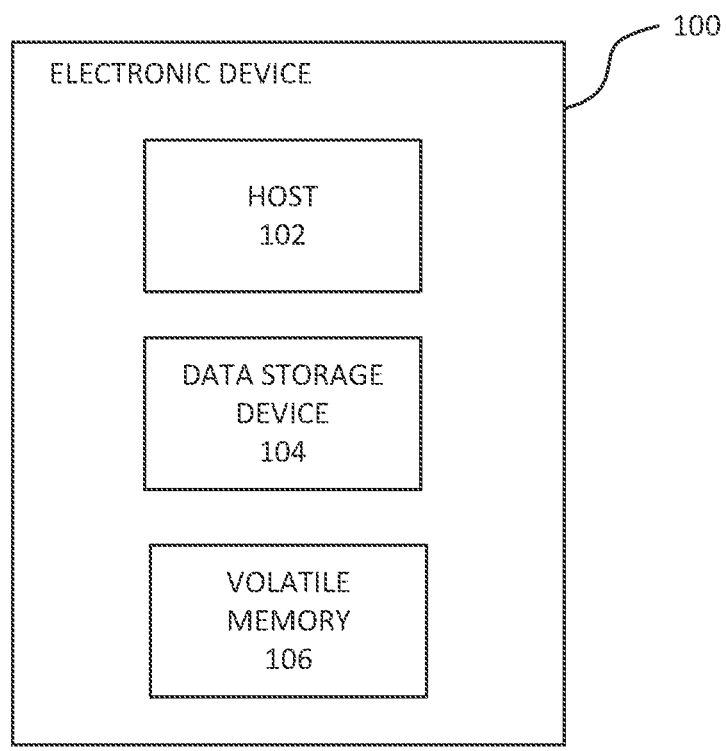
FIG. 1 depicts an electronic device according to an embodiment.

In an embodiment, an electronic device 100 is shown in FIG. 1. As seen in the embodiment shown in FIG. 1, the electronic device 100 comprises a host 102, data storage device 104, and a volatile memory 106. In an embodiment, the electronic device 100 comprises a computer, a laptop, a set top box, a tablet, a mobile communications device, or other types of device which may boot up using the data storage device 104. In an embodiment, the volatile memory comprises random access memory ("RAM") such as dynamic random access memory ("DRAM"). The volatile memory 106 can be used, for example, to cache data which may be accessed by the host 102.

Figure 2:
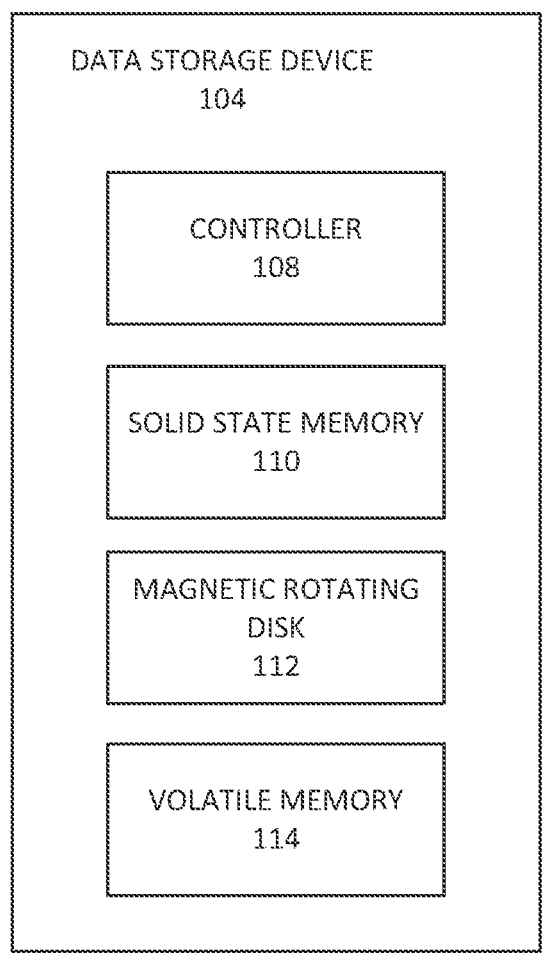
FIG. 2 depicts a data storage device according to an embodiment.

In an embodiment, the data storage device 104 is shown in FIG. 2. As shown in FIG. 2, the data storage device 104 comprises a controller 108, a solid state memory 110, an optional magnetic rotating disk 112, and a volatile memory 114. The controller 108 can control operations of the solid state memory 110, the magnetic rotating disk 112, and the volatile memory 114. In an embodiment, the solid state memory 110 comprises non-volatile memory. In an embodiment, the volatile memory 114 comprises RAM such as DRAM. The volatile memory 114 can be used, for example, to cache data for the solid state memory 110. In an embodiment, when the data storage device 104 comprises both the solid state memory 110 and the magnetic rotating disk 112, the data storage device 104 can comprise a hybrid drive.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Referring to FIG. 1 and FIG. 2, during a boot process, the host 102 can write boot data onto the solid state memory 110. In an embodiment, the boot data can comprise a startup log, information about the electronic device 100, or any combination thereof. The information about the electronic device 100 can comprise speed of interfaces, chipset settings, boot settings, or other information which may relate to a status or performance of the electronic device 100 For example, the basic input/output system ("BIOS") of the host 102, can write the boot data onto the solid state memory 110.

After the host 102 has written the boot data onto the solid state memory 110, the controller 108 can determine the logical block addresses ("LBAs") corresponding to the boot data. Thus, the controller 108 can maintain knowledge of which LBAs are being utilized for the boot data.

In an embodiment, the controller 108 can also determine a number of write erase cycles for the solid state memory 110. The number of write erase cycles can be utilized to determine when the solid state memory 110 has reached an end-of-life condition. For example, the solid state memory 110 may wear out after a certain number of write erase cycles. Thus, when the number of write erase cycles is within a predetermined number of write erase cycles from an end-of-life number of write erase cycle, the controller 108 can determine that the solid state memory 110 has reached an end-of-life condition.

The end-of-life condition for the solid state memory 110 does not mean that the solid state memory 110 could not be functional or semi-functional as a data storage device. Instead, the solid state memory 110 is approaching a number of write erase cycles where the reliability of the solid state memory 110 may not meet certain performance standards, such as performance standards set by the manufacturer.

Figure 3:
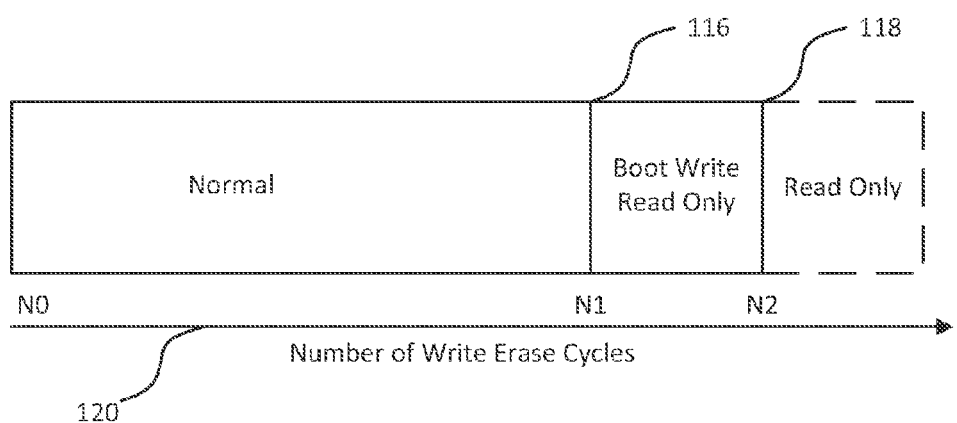
FIG. 3 depicts a mode of the solid state memory based on a number of write erase cycles according to an embodiment.

For example, as seen in FIG. 3, the number of write erase cycles 120, an end-of-life condition 116, and an end-of-life number of write erase cycles are shown. Between N0 and N1 write erase cycles, the number of write erase cycles 120 is less than a predetermined number of write erase cycles from an end-of-life number of write erase cycles 118. However, between N1 and N2, the number of write erase cycles 120 has reached an end-of-life condition 116, and is within a predetermined number of write erase cycles from an end-of-life number of write erase cycles 118. After N2, the number of write erase cycles 120 has exceeded the end-of-life number of write erase cycles 118.

In an embodiment, prior to reaching the end-of-life condition 116, the controller 108 sets the solid state memory 110 into a normal mode. That is, the solid state memory 110 can boot up normally and operate normally, including reading and writing data to the solid state memory 110 during and after the boot process. When the end-of-life condition 116 is reached, the controller 108 can set the solid state memory 110 into a boot write read only mode.

During the boot write read only mode, the controller 108 can restrict the host 102 to write to the LBAs corresponding to the boot data during the boot process. Furthermore, during the boot write read only mode, the controller 108 can set the solid state memory 110 into a read only mode when the boot process is complete. That is, during the boot process, the solid state memory 110 can write data, but after the boot process is complete, the solid state memory 110 will no longer be able to write data. However, during the boot process and after the boot process is complete, the solid state memory 110 will be able to read data.

Thus, the data storage device 104 can boot up, since the host 102 can write the boot data onto the LBAs corresponding to the boot data in the solid state memory 110 during the boot process. However, after the boot process is completed, data integrity for the data stored in the solid state memory 110 is maintained since data may not be written onto the solid state memory 110. In an embodiment, this allows a user to back up or transfer the data stored in the solid state memory 110 to another location in light of an impending end of life of the solid state memory 110. For example, the user can transfer the data to the magnetic rotating disk 112 or another data storage device. This can, for example, prevent or reduce the likelihood that the user will lose some or all data stored within the solid state memory 110.

Otherwise, the host 102 may not complete the boot process and enter a normal operation mode if the host 102 is unable to write the boot data to the solid state memory 110 during the boot process, such as with a strictly read only mode. In such a case, the user may have to remove the data storage device 104 and attempt to recover data on the solid state memory 110 by accessing it via another electronic device, or with another data storage device which completes the boot process in the same electronic device 100.

When the end-of-life number of write erase cycles 118 is reached, the controller 108 sets the solid state memory 110 into a read only mode. That is, when the number of write erase cycles is equal to or greater than the end-of-life number of write erase cycles for the solid state memory 110, the controller 108 sets the solid state memory 110 into the read only mode. In such a case, the solid state memory 110 will only be allowed to read data during and after the boot process. The writing of data to the solid state memory 110 will not be permitted.

In an embodiment, the end-of-life condition can be related or based on the spare block count for the solid state memory 110 instead of the write erase cycles shown in FIG. 3. Thus, the end-of-life condition can be reached when a spare block count for the solid state memory 110 is less than a predetermined threshold of spare block counts. Thus, as the number of spare block count dwindles, the solid state memory 110 would approach the end-of-life condition.

In an embodiment, spare blocks can be reserved in the solid state memory 110, and are not ordinarily accessible by the host 102. Instead, when there are defective blocks in the solid state memory 110, the spare blocks can be utilized to replace the defective blocks. In such a case, a spare block that is utilized to replace a defective block will be accessible by the host 102. In an embodiment, the spare block count can indicate the number of spare blocks available.

Figure 4:
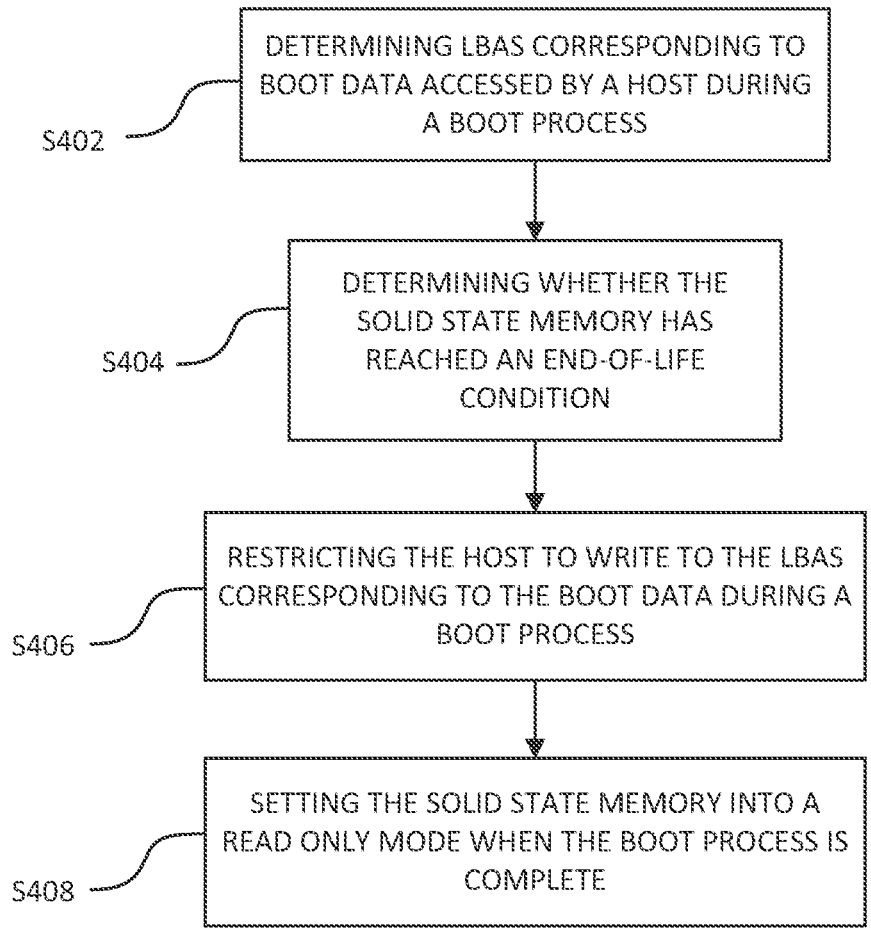
FIG. 4 depicts a process for operating a data storage device according to an embodiment.

In an embodiment, a process for operating the data storage device 104 is shown in FIG. 4. In block S402, the controller 108 determines LBAs corresponding to boot data accessed by the host 102 during the boot process. In block S404, the controller 108 determines whether the solid state memory 110 has reached an end-of-life condition, such as the end-of-life condition 116 shown in FIG. 3. Upon determining that the solid state memory 110 has reached an end-of-life condition 116, the controller 108 can set the solid state memory into a boot write read only mode in blocks S406 and S408.

In block S406, the controller 108 restricts the host to write to the LBAs corresponding to the boot data during the boot process. In an embodiment, the controller 108 can also limit the host 102 to a predetermined number of writes. In an embodiment, the predetermined number of writes is a preset number of writes. In an embodiment, the predetermined number of writes is learned by the controller 108 by observing a number of writes performed by the host during the boot process. This can, for example, reduce the number of write erase cycles to the solid state memory 110 or portions of the solid state memory 110. In block S408, the controller 108 sets the solid state memory 110 into a read only mode when the boot process is complete.

Figure 5:
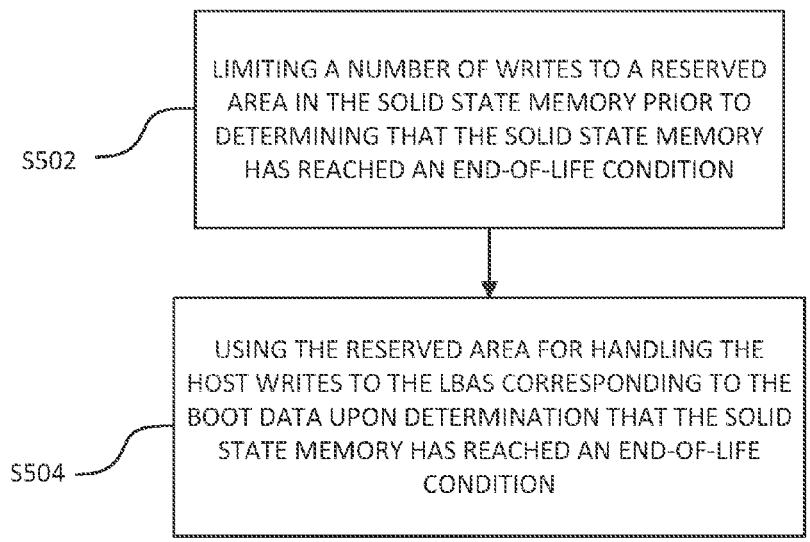
FIG. 5 depicts additional or optional blocks for a process for operating a data storage device according to an embodiment.
Figure 6:
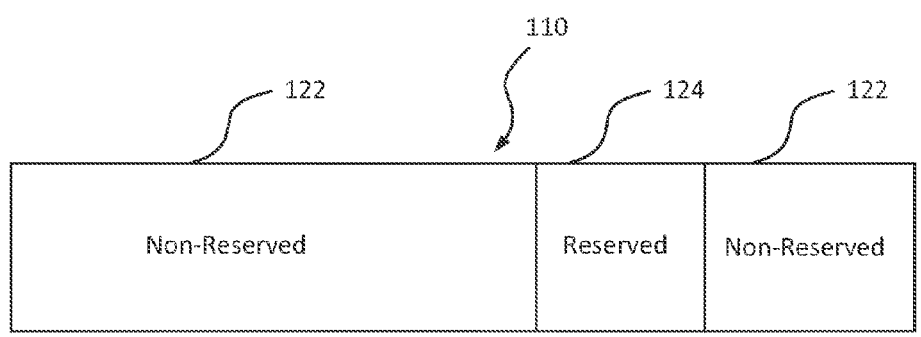
FIG. 6 depicts a solid state memory according to an embodiment.

In an embodiment, additional or optional blocks for a process for operating the data storage device 104 are shown in FIG. 5. In block S502, the controller 108 limits a number of writes to a reserved area in the solid state memory 110 prior to determining that the solid state memory has reached the end-of-life condition. For example, in the embodiment shown in FIG. 6, the solid state memory 110 can comprise non-reserved areas 122 and a reserved area 124. The non-reserved areas 122 can be available for the host 102 to write most types of data. The reserved area 124 can be reserved for the boot data.

The controller 108 can thus limit the number of writes to the reserved area 124. For example, the controller 108 can prevent other data aside from the boot data from being written to the reserved area 124. This can, for example, prolong a life of the reserved area 124 since the number of write erase cycles will be reduced. In turn, this can prolong a life of the solid state memory 110 since the boot data can be written during the boot process. This allows the solid state memory 110 to be boot up to allow access to data stored in the solid state memory 110.

Figure 7:
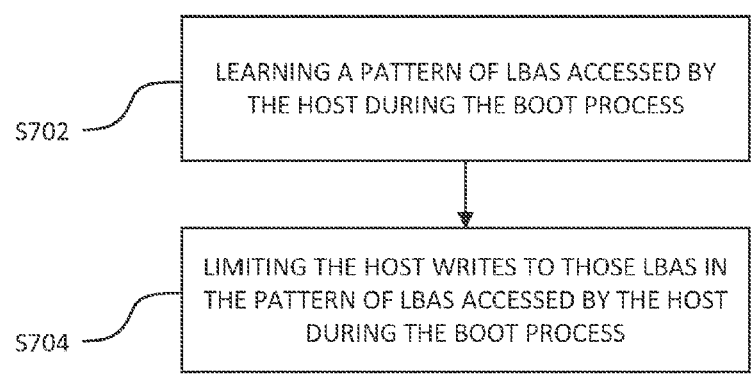
FIG. 7 depicts additional or optional blocks for a process for operating a data storage device according to an embodiment.
Figure 8:
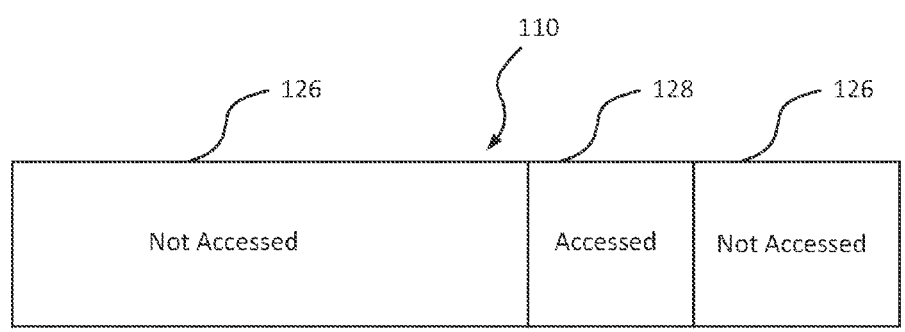
FIG. 8 depicts a solid state memory according to an embodiment.

In an embodiment, additional or optional blocks for a process for operating the data storage device 104 are shown in FIG. 7. In block S702, the controller 108 learns a pattern of LBAs accessed by the host 102 during the boot process. For example, as shown in an embodiment in FIG. 8, the solid state memory 110 can comprises LBAs 126, which are not accessed by the host 102 during the boot process, and LBAs 128, which are accessed by the host 102 during the boot process. In block S704, the controller 108 limits the host writes to those LBAs in the pattern of LBAs accessed by the host 102 during the boot process.

In an embodiment, a host processor can perform, for example, one or more of the functions disclosed above for the host 102. For example, the host processor can be configured to write boot data during a boot process. In an embodiment, the host 102 comprises the host processor. However, in an embodiment, the electronic device 100 can comprise a host processor instead of or in addition to the host 102.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A data storage device comprising:
    a solid state memory comprising logical block addresses ("LBAs") corresponding to boot data accessed by a host during a boot process; and
    a controller configured to:
        determine the LBAs corresponding to the boot data;
        determine whether the solid state memory has reached an end-of-life condition;
        upon determining that solid state memory has reached an end-of-life condition:
            restrict the host to write to the LBAs corresponding to the boot data during a boot process, and
            set the solid state memory into a read only mode when the boot process is complete.

2. The data storage device of claim 1 wherein an end-of-life condition is reached when a number of write erase cycles for the solid state memory is within a predetermined number of write erase cycles from an end-of-life number of write erase cycles for the solid state memory.

3. The data storage device of claim 2 wherein the controller is further configured to set the solid state memory into the read only mode when the number of write erase cycles is equal to or greater than the end-of-life number of write erase cycles for the solid state memory.

4. The data storage device of claim 1 wherein an end-of-life condition is reached when a spare block count for the solid state memory is less than a predetermined threshold of spare block counts.

5. The data storage device of claim 1 wherein the controller is further configured to:
    limit a number of writes to a reserved area in the solid state memory prior to determining that the solid state memory has reached an end-of-life condition; and
    use the reserved area for handling the host writes to the LBAs corresponding to the boot data upon determination that solid state memory has reached an end-of-life condition.

6. The data storage device of claim 1 wherein the controller is further configured to restrict the host writes by:
    learning a pattern of LBAs accessed by the host during the boot process; and
    limiting the host writes to those LBAs in the pattern of LBAs accessed by the host during the boot process.

7. The data storage device of claim 1 wherein the controller is further configured to restrict the host writes by:
    limiting the host to a predetermined number of writes.

8. The data storage device of claim 7 wherein the predetermined number of writes is a preset number of writes.

9. The data storage device of claim 7 wherein the predetermined number of writes is learned by observing a number of writes performed by the host during the boot process.

10. The data storage device of claim 1 further comprising a magnetic rotating disk.

11. A method for operating a data storage device comprising:
    determining logical block addresses ("LBAs") corresponding to boot data access by a host during a boot process, wherein the LBAs comprise LBAs of a solid state memory of the data storage device;
    determining whether the solid state memory has reached an end-of-life condition; and
    upon determining that the solid state memory has reached an end-of-life condition:
        restricting the host to write to the LBAs corresponding to the boot data during a boot process, and
        setting the solid state memory into a read only mode when the boot process is complete.

12. The method of claim 11 wherein an end-of-life condition is reached when a number of write erase cycles for the solid state memory is within a predetermined number of write erase cycles from an end-of-life number of write erase cycles for the solid state memory.

13. The method of claim 12 further comprising setting the solid state memory into the read only mode when the number of write erase cycles is equal to or greater than the end-of-life number of write erase cycles for the solid state memory.

14. The method of claim 11 wherein an end-of-life condition is reached when a spare block count for the solid state memory is less than a predetermined threshold of spare block counts.

15. The method of claim 11 further comprising:
limiting a number of writes to a reserved area in the solid state memory prior to determining that the solid state memory has reached an end-of-life condition; and
using the reserved area for handling the host writes to the LBAs corresponding to the boot data upon determination that the solid state memory has reached an end-of-life condition.

16. The method of claim 11 wherein the restricting the host writes further comprises:
learning a pattern of LBAs accessed by the host during the boot process; and
limiting the host writes to those LBAs in the pattern of LBAs accessed by the host during the boot process.

17. The method of claim 11 wherein the restricting the host writes further comprises:
limiting the host to a predetermined number of writes.

18. The method of claim 17 wherein the predetermined number of writes is a preset number of writes.

19. The method of claim 17 wherein the predetermined number of writes is learned by observing a number of writes performed by the host during the boot process.

20. The method of claim 11 wherein the data storage device further comprises a magnetic rotating disk.

21. An electronic device comprising:
a host processor configured to write boot data during a boot process; and
a data storage device comprising:
a solid state memory comprising logical block addresses ("LBAs") corresponding to the boot data accessed by the host processor during the boot process; and
a controller configured to:
determine the LBAs corresponding to the boot data from the host processor;
determine whether the solid state memory has reached an end-of-life condition;
upon determining that the solid state memory has reached an end-of-life condition:
restrict the host processor to write to the LBAs corresponding to the boot data during a boot process, and
set the solid state memory into a read only mode when the boot process is complete.

22. The electronic device of claim 21 wherein an end-of-life condition is reached when a number of write erase cycles for the solid state memory is within a predetermined number of write erase cycles from an end-of-life number of write erase cycles for the solid state memory.

23. The electronic device of claim 22 wherein the controller is further configured to set the solid state memory into the read only mode when the number of write erase cycles is equal to or greater than the end-of-life number of write erase cycles for the solid state memory.

24. The electronic device of claim 21 wherein an end-of-life condition is reached when a spare block count for the solid state memory is less than a predetermined threshold of spare block counts.

25. The electronic device of claim 21 wherein the controller is further configured to:
limit a number of writes to a reserved area in the solid state memory prior to determining that the solid state memory has reached an end-of-life condition; and
use the reserved area for handling the writes from the host processor to the LBAs corresponding to the boot data upon determination that the solid state memory has reached an end-of-life condition.

26. The electronic device of claim 21 wherein the controller is further configured to restrict the writes from the host processor by:
learning a pattern of LBAs accessed by the host processor during the boot process; and
limiting the writes by the host processor to those LBAs in the pattern of LBAs accessed by the host processor during the boot process.

27. The electronic device of claim 21 wherein the controller is further configured to restrict the writes from the host processor by:
limiting the writes by the host processor to a predetermined number of writes.

28. The electronic device of claim 27 wherein the predetermined number of writes is a preset number of writes.

29. The electronic device of claim 27 wherein the predetermined number of writes is learned by observing a number of writes performed by the host processor during the boot process.

30. The electronic device of claim 21 further comprising a magnetic rotating disk.

31. The electronic device of claim 21 wherein the host processor further comprises a basic input/output system ("BIOS") configured to write at least a portion of the boot data during the boot process.

* * * * *